United States Patent
Amini et al.

(10) Patent No.: US 10,954,845 B2
(45) Date of Patent: Mar. 23, 2021

(54) ACTIVELY CONTROLLED COOLANT TANK TO INCREASE THERMAL STORAGE CAPACITY OF HYBRID ELECTRIC VEHICLES

(71) Applicant: THE REGENTS OF THE UNIVERSITY OF MICHIGAN, Ann Arbor, MI (US)

(72) Inventors: Mohammad Reza Amini, Ann Arbor, MI (US); Jing Sun, Superior Township, MI (US); Ilya Kolmanovsky, Ann Arbor, MI (US); Hao Wang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/665,612

(22) Filed: Oct. 28, 2019

(65) Prior Publication Data
US 2020/0131976 A1 Apr. 30, 2020

Related U.S. Application Data

(60) Provisional application No. 62/752,427, filed on Oct. 30, 2018.

(51) Int. Cl.
| | |
|---|---|
| *F01P 7/00* | (2006.01) |
| *F01P 3/20* | (2006.01) |
| *B60K 11/02* | (2006.01) |
| *B60H 1/04* | (2006.01) |

(Continued)

(52) U.S. Cl.
CPC .............. *F01P 3/20* (2013.01); *B60H 1/04* (2013.01); *B60K 11/02* (2013.01); *F01P 3/18* (2013.01);

(Continued)

(58) Field of Classification Search
CPC ............ F01P 2011/205; F01P 2060/08; B60H 1/00492; B60H 1/00499

(Continued)

(56) References Cited

U.S. PATENT DOCUMENTS

| | | | |
|---|---|---|---|
| 10,395,444 B1 * | 8/2019 | Edren | G07C 5/0808 |
| 2009/0133415 A1 | 5/2009 | Major et al. | |

(Continued)

FOREIGN PATENT DOCUMENTS

JP 2013163494 A 8/2013

OTHER PUBLICATIONS

International Search Report and Written Opinion for PCT/US2019/058535 dated Feb. 18, 2020.

*Primary Examiner* — Long T Tran
*Assistant Examiner* — James J Kim
(74) *Attorney, Agent, or Firm* — Harness, Dickey & Pierce, P.L.C.

(57) ABSTRACT

An engine and cabin thermal management system for use with a vehicle having an engine, a cabin heating system configured to thermally heat a cabin of the vehicle, a coolant system operably coupled to the engine and to the cabin heating system to thermally manage a temperature of the engine and a temperature of the cabin. The coolant system having one or more coolant thermal storage units fluidly coupled with a radiator and heater core of the coolant system forming a coolant loop. The system further having a control system configured to monitor and maintain at least a predetermined coolant temperature at the cabin heating system even during a coolant temperature decrease at the engine stops.

10 Claims, 4 Drawing Sheets

(51) Int. Cl.
   *F01P 3/18*    (2006.01)
   *F01P 7/16*    (2006.01)
   *F01P 5/10*    (2006.01)

(52) U.S. Cl.
   CPC . *F01P 7/16* (2013.01); *F01P 5/10* (2013.01); *F01P 2003/182* (2013.01); *F01P 2025/12* (2013.01); *F01P 2025/30* (2013.01); *F01P 2025/66* (2013.01); *F01P 2060/08* (2013.01)

(58) Field of Classification Search
   USPC .................................................. 123/41.02
   See application file for complete search history.

(56) References Cited

U.S. PATENT DOCUMENTS

| | | |
|---|---|---|
| 2010/0186685 A1 | 7/2010 | Hiyama |
| 2010/0236769 A1* | 9/2010 | Lyons .................... B60H 1/025 165/200 |
| 2011/0276210 A1* | 11/2011 | Tanaka ................ B60W 30/194 701/22 |
| 2013/0047639 A1* | 2/2013 | Stannard .................. B60H 1/20 62/79 |
| 2013/0192271 A1* | 8/2013 | Barnhart ............ B60H 1/00885 62/3.3 |
| 2013/0197749 A1 | 8/2013 | Martini et al. |
| 2016/0281584 A1* | 9/2016 | Gonze ...................... F01P 11/16 |
| 2017/0355245 A1* | 12/2017 | Bergweiler ........ B60H 1/00778 |
| 2018/0273018 A1* | 9/2018 | Follen ...................... B60L 7/10 |
| 2018/0340740 A1* | 11/2018 | Sutherland ............. F28D 19/02 |
| 2019/0275858 A1* | 9/2019 | Seki ........................ B60H 1/22 |

\* cited by examiner

ACTIVELY CONTROLLED COOLANT TANK TO INCREASE THERMAL STORAGE CAPACITY OF HYBRID ELECTRIC VEHICLES

CROSS-REFERENCE TO RELATED APPLICATIONS

This application claims the benefit of U.S. Provisional Application No. 62/752,427 filed on Oct. 30, 2018. The entire disclosure of the above application is incorporated herein by reference.

GOVERNMENT INTEREST

The invention was made with government support under DE-AR0000797 awarded by the U.S. Department of Energy. The government has certain rights in the invention.

FIELD

The present disclosure relates to coolant tanks of a combustion engine thermal management system and, more particularly, relates to an actively controlled coolant tank to increase thermal storage capacity of hybrid electric vehicles (HEVs).

BACKGROUND AND SUMMARY

This section provides background information related to the present disclosure which is not necessarily prior art. This section provides a general summary of the disclosure, and is not a comprehensive disclosure of its full scope or all of its features.

During cold weather, combustion engine coolant temperature plays an important role in the engine, after-treatment, and cabin climate control systems. For hybrid electric vehicles (HEVs), the engine is often the main source for cabin heating. This means that during vehicle long stops at the intersections, while there is no need for traction power (for driving) and the engine is preferred to be off to save fuel, in order to provide the heat for the cabin climate control system, the engine has to be turned on. As a result, the vehicle fuel economy (mile per gallon) can decrease significantly during congested city driving scenarios, compared to the case where there is no need for heating the cabin.

According to the principles of the present teachings, a modified/additional coolant tank system, as an actively controlled coolant tank, is provided that acts as a thermal storage and stores the hot coolant during the high engine speed operations when abundant engine heat is available, and releases the hot coolant into the coolant main loop when engine heat is not available, such as during the vehicle stops. According to preliminary results, by actively controlling the coolant's temperature, flow, and volume inside the tank with respect to traffic conditions, the engine-on time can be reduced by more than 11%, resulting in a reduction in vehicle energy consumption by 4%.

Conventionally, the closest known product/technology is a passively controlled coolant heat storage by Toyota. The details of this technology can be found in "Development of New Generation Hybrid System (THS II)—Development of Toyota Coolant Heat Storage System". The current "Toyota Coolant Heat Storage System" saves the hot coolant at the end of a drive to be re-used in the next drive in up to three days. This means that the coolant tank is mainly being used to improve the vehicle fuel economy during the so-called cold-start period, during which the saved hot coolant in the tank, from the previous cycle, is used to warm up the engine in cold weather. With the current "Toyota Coolant Heat Storage System" technology, the coolant is not been actively controlled during the normal driving according to traffic preview information.

Conversely, the present teachings provide an actively controlled coolant tank that can operate separate from or in concert with the current Toyota technology to not only improve the fuel economy and reduce the emissions during the cold-start, but also optimize the engine operation and fuel economy during general drive according to traffic preview information while satisfying the cabin heating requirements.

In some embodiments, these traffic preview information includes vehicle speed prediction and optimization based on vehicle-to-infrastructure (V2I) and vehicle-to-vehicle (V2V) communication for connected and automated vehicles. In some embodiments, the present teachings can benefit from known future vehicle speed based on real-time traffic flow data or trip information from GPS, and thus capitalize on this knowledge to improve the vehicle fuel economy by actively controlling the coolant tank in real-time.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
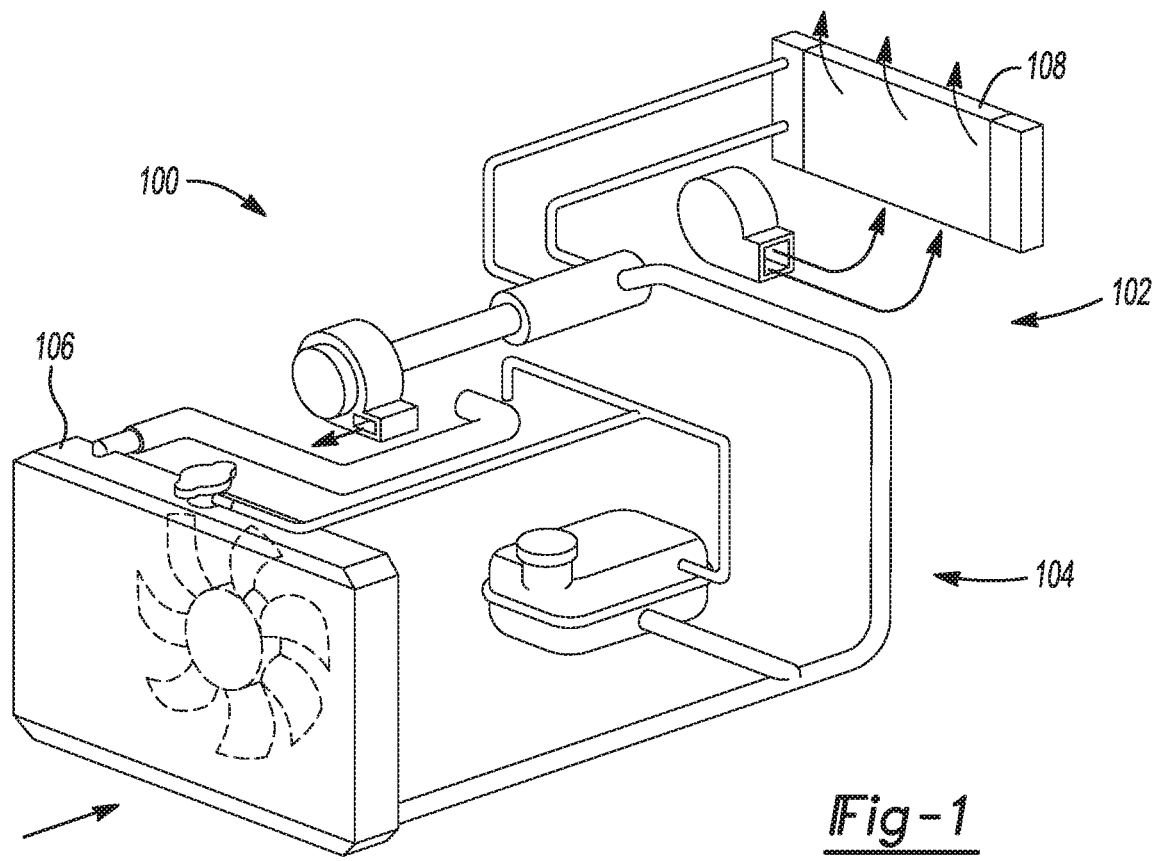
FIG. 1 is a schematic of an engine cooling and cabin heating systems according to the prior art.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a schematic of a conventional engine cooling system 100 is illustrated having a conventional cabin heating system 102 and a coolant tank system 104. As can be seen from this figure, the coolant is being used to cool the engine to ensure the engine operates within the desired temperature range. Depending on the coolant and engine temperature and cabin heating requirement, the heat rejected from the engine by the coolant will be either dissipated to ambient via the radiator 106, or/and will be used to heat up the cabin air temperature via the heat core 108. While in highway driving scenario the generated heat by the engine is exceeding the cabin heating requirement and part of the generated heat is wasted to ambient, in the city driving scenario, because of the low engine speed operation, the coolant temperature can drop if the vehicle and engine stops, e.g., at the traffic lights.

For HEVs, while the battery is also being used for traction (driving) purposes, the combustion engine is usually the only source of heating for cabin. This means that ideally it is preferred to turn off the engine at the long vehicle stops to save fuel and use the electric propulsion system (battery) more often during the city driving scenario. However, due to cabin heating requirement and the drop in the coolant temperature while the engine is off, the combustion engine is required to run for a longer period to heat up the coolant and provide warm air to the cabin.

Figure 2:
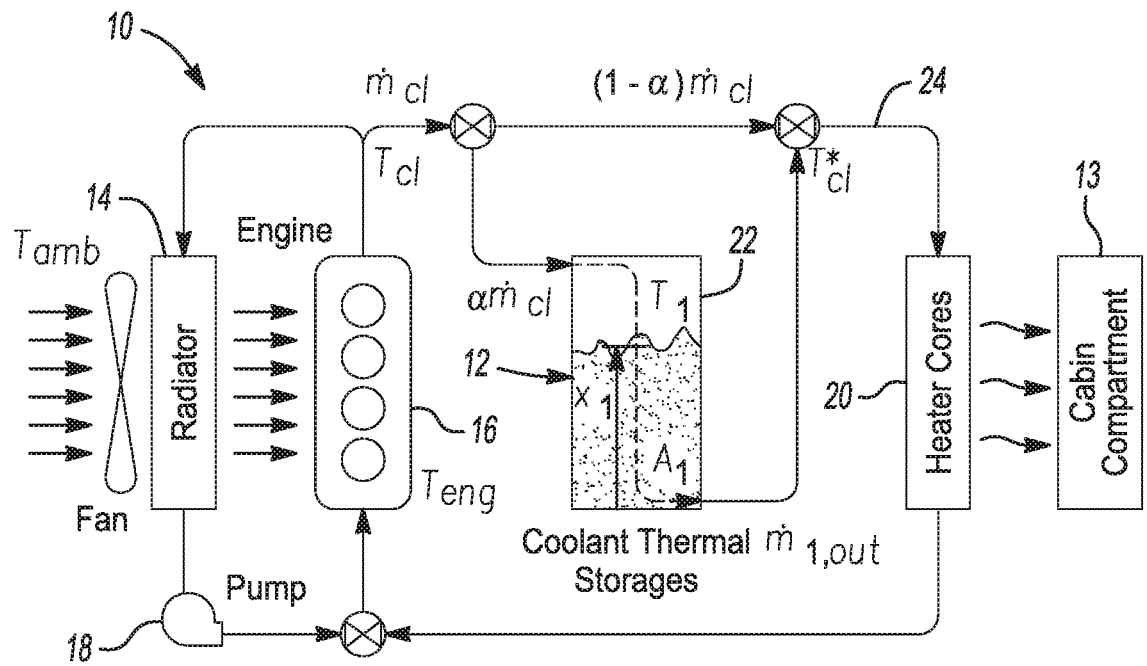
FIG. 2 is a modified engine and cabin thermal management system with the additional coolant tank according to the principles of the present teachings.
Figure 7:
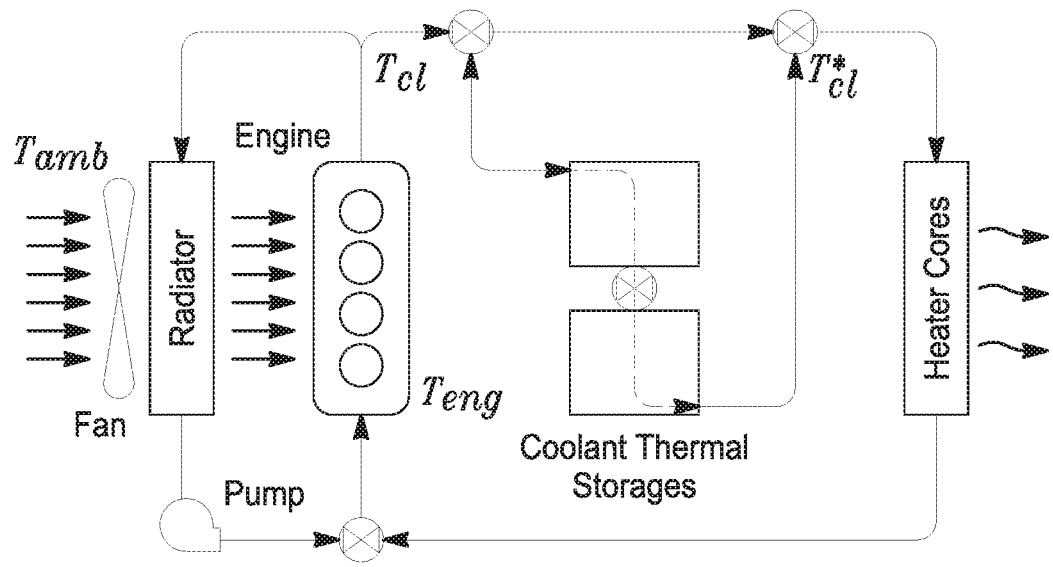
FIG. 7 is a modified engine and cabin thermal management system with a plurality of additional coolant tanks according to the principles of the present teachings.

According to the principles of the present teachings, as illustrated in FIGS. 2 and 7, an additional/modified actively controlled coolant tank system 12 (aka engine and cabin thermal management system), which is controlled according to the traffic and vehicle speed preview, is used within an engine cooling system 10 of a vehicle 11 having a passenger cabin 13. Generally, the engine cooling system 10 can be used with several conventional cooling system components, such as, but not limited to, a radiator 14, an engine 16, a coolant pump 18, a heater core 20, and other componentry (e.g. thermostat, control system, hoses, and valve systems).

Actively controlled coolant tank system 12 reduces waste heat by saving the rejected heat from the engine 16 into the coolant inside the storage tank 22, and when the engine 16 is preferred to be stopped to save fuel, release the saved thermal energy into the coolant loop 24 to provide heat to the cabin via heater core 20 without forcing the engine 16 to run at vehicle stops or intersections. It should be appreciated, as illustrated in FIGS. 1 and 7, the storage tank 22 can comprise any one of a plurality of configurations, including varying shapes, sizes, thermal characteristics and insulating properties, and the like.

The present teachings take advantage of the "slow thermal dynamics" of the coolant system. This means that the saved energy in the coolant inside the tank 22 will not be dissipated upon its release into the coolant main loop as the coolant has a slow thermal dynamics and its temperature drops slowly. This slow thermal dynamic characteristic of the coolant temperature allows one to extend the engine stop period at the long vehicle stops, and consequently improve the vehicle fuel economy.

To determine the effect of engine and cabin thermal management system 12 on the overall fuel economy, we can consider the system shown in FIG. 2. $T_{amb}$, $T_{cl}$, $T_{eng}$, $T^*_{cl}$, and $T_1$ are the ambient temperature, coolant temperature at the engine outlet, engine block temperature, coolant temperature at the heat core inlet, and coolant temperature inside the storage tank, respectively. $x_1$ and $A_1$ are the height of the coolant inside the tank, and the fixed cross-area of the coolant tank, respectively. $\dot{m}_{cl}$ is the mass flow rate of the coolant at the engine outlet, and $\dot{m}_{1,out}$ is the coolant mass flow rate at the tank outlet. $0<\alpha<1$ is a decision variable indicating the amount of the coolant being bypassed to the tank. The coolant level inside the tank ($x_1$) is modeled using the following equation:

$$\dot{x}_1 = \frac{1}{A_1\rho_{cl}}\left(\alpha \dot{m}_{cl} - \rho_{cl}a_1\sqrt{2gx_1(t)}\right) \quad (1)$$

Where $\rho_{cl}$ is the coolant density and g is the gravity. $a_1$ is the tank outlet valve area controlling the mass flow rate of the coolant exiting the tank. It is assumed that the coolant flow rate at the engine outlet ($\dot{m}_{cl}$) is constant. The size of the coolant tank in this special embodiment is assumed to be 20×20×20 cm³ (8 liters). Additionally assuming a constant coolant density and no drop in the coolant pressure across the thermal management loops, the temperature of the coolant inside the tank ($T_1$) is a function of the coolant temperature at the engine outlet ($T_{cl}$), the amount of coolant flow being re-directed into the tank ($\alpha$), and the coolant tank outlet valve opening area ($a_1$). The dynamics of $T_1$ is modeled as follows:

$$\dot{T}_1 = \frac{1}{x_1}\left(-\dot{x}_1 T_1 + \frac{1}{A_1\rho_{cl}}\left(\alpha \dot{m}_{cl}T_{cl} - \rho_{cl}a_1\sqrt{2gx_1(t)}\,T_1\right)\right) \quad (2)$$

The temperature of the coolant at the heat core inlet ($T^*_{cl}$) is a function of the coolant temperature at the engine output ($T_{cl}$) and the temperature of the coolant stored in the tank ($T_1$), the tank outlet valve opening area ($a_1$), and the bypassed coolant flow into the tank $\alpha$:

$$T^*_{cl} = \frac{\rho_{cl}a_1\sqrt{2gx_1(t)}\,T_1 + (1-\alpha)\dot{m}_{cl}T_{cl}}{\rho_{cl}a_1\sqrt{2gx_1(t)} + (1-\alpha)\dot{m}_{cl}} \quad (3)$$

Depending on how one adjusts $\alpha$ and $a_1$, the coolant temperature at the heat core inlet can be higher or lower than the coolant temperature at the engine outlet ($T_{cl}$). Additionally, to ensure that the coolant flow rate after being combined at the coolant tank with the remaining $(1-\alpha)\dot{m}_{cl}$ flow from the engine outlet is the same as the coolant mass flow rate at the engine outlet:

$$\rho_{cl}a_1\sqrt{2gx_1(t)} + (1-\alpha)\dot{m}_{cl} = \dot{m}_{cl} \quad (4)$$

Eq. (4) should be considered as an operating constraint while designing a controller to adjust $a_1$ and $\alpha$.

In the next step, we solve the following real-time optimization problem to adjust $a_1$ and $\alpha$ so that the $T^*_{cl}$ is not dropping when the vehicle stops by using the coolant stored in the tank 22. To solve and implement the following optimization problem, we use the model predictive control (MPC) technique to calculate the control inputs ($a_1$ and $\alpha$) while enforcing the thermal system operating constraints:

$$\min_{\alpha, a_1, \epsilon} J = \sum_i^{i+N}(T^*_{cl}(i) - T_1(i))^2 + \\ w_1(x_1(i) - x_1^{s.p.}(i))^2 + w_2(T_1(i) - T_1^{s.p.}(i))^2 + w_3\epsilon^2(i) \quad (5)$$

Subject to the following constraints:

$$x_1(i+1) = x_1(i)\frac{1}{A_1\rho_{cl}}\left(\alpha \dot{m}_{cl} - \rho_{cl}a_1\sqrt{2gx_1(i)}\right)$$

$$T_1(i+1) = T_1(i) + \frac{1}{x_1}\left(-\dot{x}_1 T_1 + \frac{1}{A_1\rho_{cl}}\left(\alpha \dot{m}_{cl}T_{cl} - \rho_{cl}a_1\sqrt{2gx_1(i)}\,T_1\right)\right)$$

$$x_{1,min} \le x_1(i) \le x_{1,max} + \epsilon(i),\, x_{1,max} < 20 \text{ cm}$$

$$a_{1,min} \le a_1(i) \le a_{1,max}$$

$$\alpha_{min} \le \alpha(i) \le \alpha_{max}$$

$$0.9\alpha \dot{m}_{cl} \le \rho_{cl}a_1\sqrt{2gx_1(i)} \le \alpha \dot{m}_{cl}$$

$$0 \le \epsilon(i)$$

Specific sampling time of 1 sec is used for illustration purposes. $\epsilon$ is a slack optimization variable to guarantee the feasibility of the above optimization problem. $x_1^{s.p.}$ and $T_1^{s.p.}$ are the setpoints for the coolant level and temperature inside the tank. It can be seen from Eq. (5) that the objective is to keep the coolant level and temperature at constant levels $x_1^{s.p.}$ and $T_1^{s.p.}$ at different vehicle speeds, while minimizing the difference between $T^*_{cl}$ and $T_1$. This enables control of the coolant temperature at the heater core 20 with respect to the coolant temperature stored inside the tank 22. Moreover, the optimization problem is solved while enforcing the above constraints including the tank inlet and outlet valve openings $a_1$ and $\alpha$, the level of the coolant inside the tank, and Eq. (4). The optimization problem in Eq. (5) is solved over a finite time horizon (N) during which it is assumed that the temperature of the coolant at the engine outlet can be predicted according to the available traffic and vehicle speed information. $w_1$, $w_2$ and $w_3$ are constant weighting coefficients. Moreover, in the following simulation results a rule-based controller is considered for the HEV powertrain to determine the power split between combustion engine and the electric battery.

Figure 3:
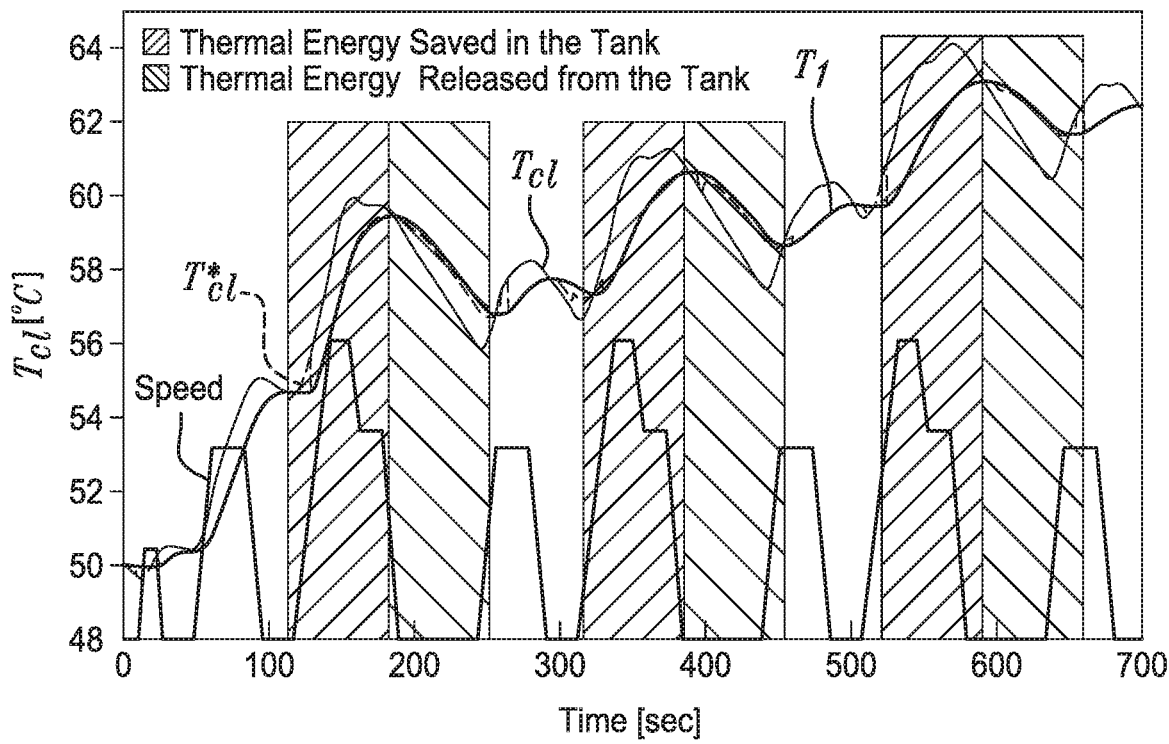
FIG. 3 is a graph showing the effects of the actively controlled coolant tank on the temperature of the coolant at the cabin heat core inlet.
Figure 4:
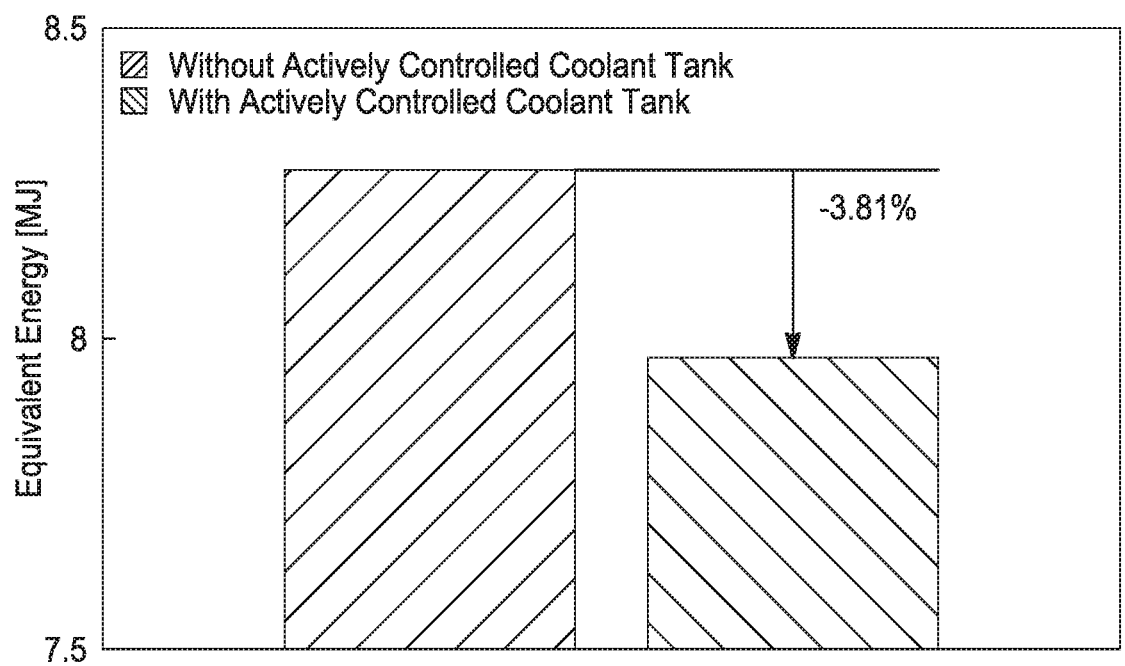
FIG. 4 illustrates the impact of the actively controlled tank on the vehicle's overall energy consumption over a sample driving cycle.

FIG. 3 shows the results of applying the proposed actively coolant tank configuration of FIG. 1 along with the designed MPC controller in Eq. (5). As can be seen, when the vehicle speed is zero, the coolant temperature at the engine outlet ($T_{cl}$) drops as the engine is commanded to stop. On the other hand, when the vehicle runs at higher speeds, $T_{cl}$ increases. Part of the coolant flow at the engine outlet is being re-directed to be stored in the tank at high vehicle speeds. This increases the level and temperature of the stored coolant in the tank. When the vehicle comes to stop, the MPC commands the coolant tank to release the stored hot coolant into the coolant loop to provide warm coolant for the heat core inlet ($T^*_{cl}$) while the engine run time is minimized to save fuel. Thermal "charging" and "discharging" of the thermal storage system are clearly observed from FIG. 3 over the vehicle driving cycle (speed). Overall, the proposed actively controlled coolant tank can be considered as a thermal storage to store the exceeding engine heat at high vehicle speeds, and release the stored heat for heating the cabin when the vehicle stops. The impact of the proposed coolant tank on the overall vehicle energy consumption compared to the conventional case with a passive coolant tank is shown in FIG. 4 for the drive cycle of FIG. 3. It can be seen that with the same powertrain controller and the same heating requirements, the addition of the proposed tank along with the design MPC (Eq. (5)) can reduce the vehicle energy consumption by 3.81% compared to the conventional case.

Figure 5:
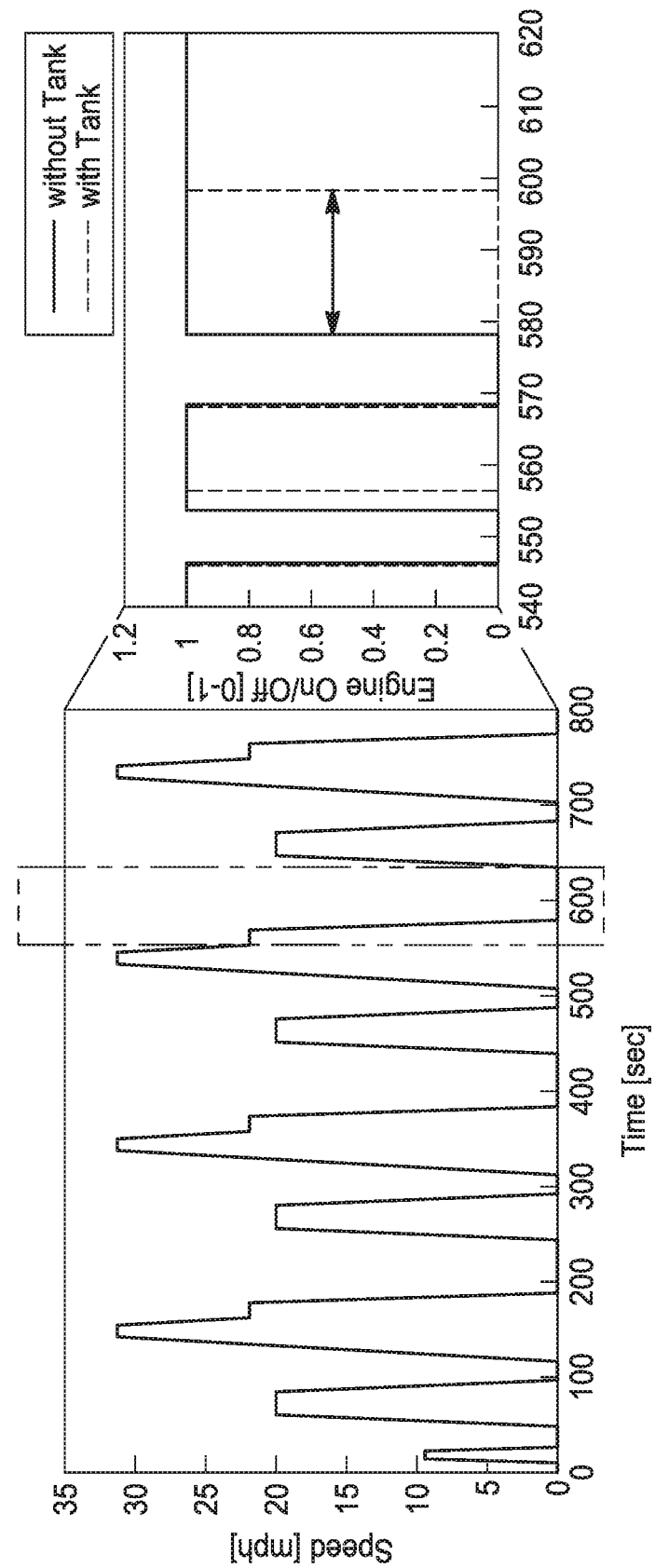
FIG. 5 illustrates the impact of the actively controlled tank on the engine stop periods.
Figure 6:
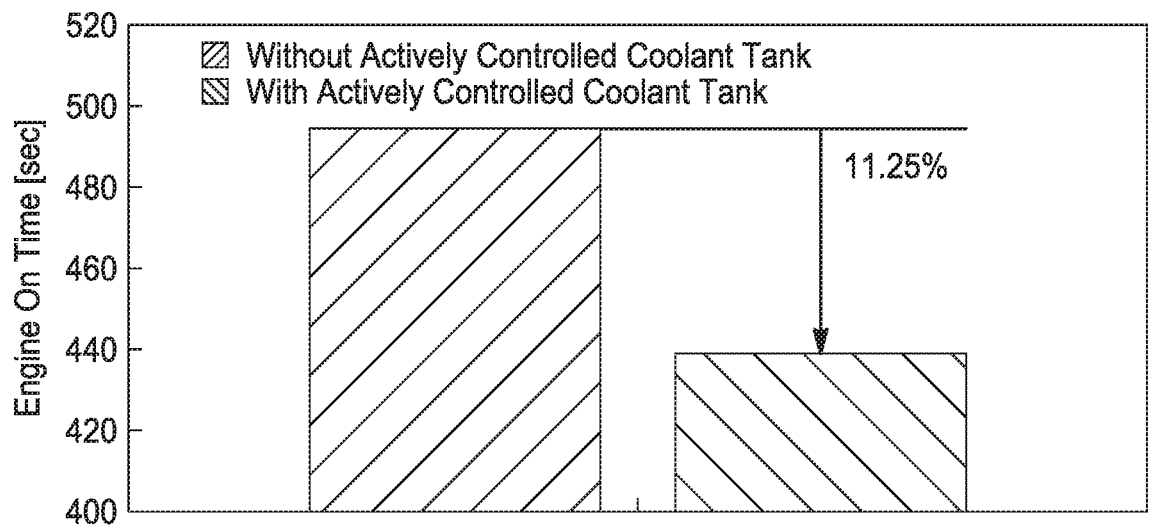
FIG. 6 illustrates an engine on time over a sample driving cycle for the conventional thermal management system compared to the thermal management system with the actively controlled coolant tank with a model predictive controller (MPC) of the present teachings.

FIG. 5 and FIG. 6 show that for the same driving cycle in FIG. 3, the proposed thermal management system with the actively controlled coolant tank with MPC extends the engine Off (stop) periods at the vehicle stops. For the specific driving cycle studied (FIG. 3) in the simulation results, the proposed actively controlled tank can reduce the engine ON time by 11.25% compared to the conventional engine and cabin thermal management system (FIG. 1). This means that the need to run the engine at the vehicle stops to provide heat for the cabin is relaxed by using the energy stored in the tank.

FIG. 7 is a modified engine and cabin thermal management system with a plurality of additional coolant tanks according to the principles of the present teachings. As compared to the architecture illustrated in FIG. 2, the architecture of FIG. 7 has the potential to increase the thermal energy storage or downsizing the overall coolant tank (in size and mass) with the same thermal storage capacity of the architecture shown in FIG. 2. This requires additional control logic for the valve connecting the two coolant tanks. With the FIG. 7 architecture, it becomes possible to store the hot coolant in one of the tanks (i.e., hot tank), and use the coolant inside the second tank (i.e., cold tank) within the engine cooling loop. As an example, with the incorporated vehicle speed preview, once the controller detects or receives information on any congestion along the trip, it will save the hot coolant in the hot tank while the engine is running during the drive. Once the vehicle enters the congested area, it will release the hot coolant from the hot tank to the cold tank and to the engine cooling loop to provide heating to the cabin without being forced to turn on the engine and consume fuel.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An engine and cabin thermal management system for use with a vehicle, the engine, and cabin thermal management system comprising:
   an engine;
   a cabin heating system configured to thermally heat a cabin of the vehicle;
   an actively controlled coolant tank system having coolant, the actively controlled coolant tank system being operably coupled to the engine and to the cabin heating system to thermally manage a temperature of the engine, a temperature of the coolant inside and outside of the tank system, and a temperature of the cabin, the actively controlled coolant tank system having one or more coolant thermal storage units fluidly coupled with a radiator and heater core of the actively controlled coolant tank system forming a coolant loop with two or more actuators configured to be continuously controlled during operation of the engine and engine stops; and
   a predictive and optimization-based control system configured to monitor and maintain via the two or more actuators at least a predetermined coolant temperature at the cabin heating system even during a coolant temperature decrease at the engine stops, the predictive and optimization-based control system configured to monitor and maintain the predetermined coolant temperature at the cabin heating system based at least in part on traffic preview in a model predictive scheme while monitoring and maintaining a coolant level inside the one or more coolant thermal storage units, the model predictive scheme predicting the temperature and level of coolant inside the one or more coolant thermal storage units thereby coordinating the temperature and level of coolant inside the one or more coolant thermal storage units based on traffic and vehicle speed, the predictive and optimization-based control system further configured to ensure a minimum level of coolant is maintained within the one or more coolant thermal storage units to achieve the model predictive scheme.

2. The engine and cabin thermal management system according to claim 1 wherein the predictive and optimization-based control system actively outputs coolant stored in the coolant thermal storage unit to the coolant loop.

3. The engine and cabin thermal management system according to claim 1 wherein the predictive and optimization-based control system actively outputs coolant stored in the coolant thermal storage unit in response to predicted vehicle speed.

4. The engine and cabin thermal management system according to claim 1 wherein the control system predictive and optimization-based actively input coolant into the coolant thermal storage unit in response to predicted vehicle speed or traffic flow information in anticipation of an upcoming engine stop.

5. The engine and cabin thermal management system according to claim 1, wherein the predictive and optimization-based control system is configured to add coolant from the engine to the coolant thermal storage unit when the engine is operating and to add coolant from the coolant thermal storage unit to the cabin heating system when the engine is not operating.

6. A vehicle comprising:
   an engine;
   a passenger cabin;
   a cabin heating system configured to thermally heat the passenger cabin of the vehicle;
   an actively controlled coolant tank system having coolant, the actively controlled coolant tank system being fluidly coupled to the engine and to the cabin heating system to independently thermally manage a temperature of the engine, a temperature of the coolant inside and outside of the tank system, and a temperature of the passenger cabin, the actively controlled coolant tank system having one or more coolant thermal storage units fluidly coupled with a radiator and heater core of the actively controlled coolant tank system forming a coolant loop with two or more actuators configured to be continuously controlled during operation of the engine and engine stops; and
   a predictive and optimization-based control system configured to monitor and maintain via the two or more actuators at least a predetermined coolant temperature at the cabin heating system even during a coolant temperature decrease at the engine stops, the predictive and optimization-based control system configured to monitor and maintain the predetermined coolant temperature at the cabin heating system based at least in part on traffic preview in a model predictive scheme while monitoring and maintaining a coolant level inside the one or more coolant thermal storage units, the model predictive scheme predicting the temperature and level of coolant inside the one or more coolant thermal storage units thereby coordinating the temperature and level of coolant inside the one or more coolant thermal storage units based on traffic and vehicle speed, the predictive and optimization-based control system further configured to ensure a minimum level of coolant is maintained within the one or more coolant thermal storage units to achieve the model predictive scheme.

7. The vehicle according to claim 6 wherein the predictive and optimization-based control system actively outputs coolant stored in the coolant thermal storage unit to the coolant loop.

8. The vehicle according to claim 6 wherein the predictive and optimization-based control system actively outputs coolant stored in the coolant thermal storage unit in response to predicted vehicle speed.

9. The vehicle according to claim 6 wherein the predictive and optimization-based control system actively input coolant into the coolant thermal storage unit in response to predicted vehicle speed.

10. The vehicle according to claim 6, wherein the predictive and optimization-based control system is configured to add coolant from the engine to the coolant thermal storage unit when the engine is operating and to add coolant from the coolant thermal storage unit to the cabin heating system when the engine is not operating.

* * * * *